US008860739B2

(12) United States Patent  
Vitella-Espinoza

(10) Patent No.: US 8,860,739 B2
(45) Date of Patent: Oct. 14, 2014

(54) METHOD AND DEVICE FOR PROCESSING DIGITAL IMAGES

(75) Inventor: Jordan Vitella-Espinoza, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 756 days.

(21) Appl. No.: 13/000,352

(22) PCT Filed: Jul. 1, 2009

(86) PCT No.: PCT/EP2009/058257
§ 371 (c)(1),
(2), (4) Date: Mar. 22, 2011

(87) PCT Pub. No.: WO2010/000775
PCT Pub. Date: Jan. 7, 2010

(65) Prior Publication Data
US 2011/0157199 A1  Jun. 30, 2011

Related U.S. Application Data

(60) Provisional application No. 61/078,360, filed on Jul. 4, 2008.

(30) Foreign Application Priority Data

Jul. 4, 2008 (EP) ..................... 08159587

(51) Int. Cl.
G06F 15/167 (2006.01)
G06T 1/60 (2006.01)
(52) U.S. Cl.
CPC .......................... *G06T 1/60* (2013.01)
USPC ............................ 345/541; 345/542; 345/543
(58) Field of Classification Search
CPC .......... G09G 5/363; G09G 5/001; G09G 5/39
See application file for complete search history.

(56) References Cited

U.S. PATENT DOCUMENTS 5,671,440 A   9/1997 Curry
5,953,021 A * 9/1999 Cheng ........................... 345/544
(Continued)

FOREIGN PATENT DOCUMENTS

WO     01/26056 A    4/2001

OTHER PUBLICATIONS

PCT International Search Report, dated Apr. 16, 2010, in connection with International Application No. PCT/EP2009/058257.
PCT International Preliminary Report on Patentability, dated Jan. 13, 2011, in connection with International Application No. PCT/EP2009/058257.
EPO 94(3) Communication, dated Sep. 30, 2011, in connection with European Application No. 08 159 587.8-2218.

(Continued)

Primary Examiner — David Zarka
Assistant Examiner — Tapas Mazumder
(74) Attorney, Agent, or Firm — Leffler Intellectual Property Law, PLLC

(57) ABSTRACT

Disclosed is a method of processing a digital representation comprising a plurality of cells having respective cell values and being arranged in a regular grid. The method comprises performing at least one cell data reordering operation and performing at least one arithmetic operation for computing at least a first cell value of a first cell from one or more cell values of respective cells of the digital representation, each arithmetic operation including at least one multiplication. The method comprises performing the at least one reordering operation and the at least one arithmetic operation as at least two concurrent processes, each of the concurrent processes reading respective parts of the digital representation from respective memory buffers of a shared memory.

25 Claims, 4 Drawing Sheets

(56) References Cited

U.S. PATENT DOCUMENTS

| | | | |
|---|---|---|---|
| 6,161,169 A * | 12/2000 | Cheng | 711/150 |
| 2002/0004860 A1 | 1/2002 | Roman | |
| 2002/0095562 A1* | 7/2002 | Nakanishi et al. | 712/34 |
| 2003/0038809 A1* | 2/2003 | Peng et al. | 345/530 |
| 2006/0061592 A1* | 3/2006 | Akenine-Moller et al. | 345/611 |
| 2007/0081542 A1* | 4/2007 | Kazban et al. | 370/397 |

OTHER PUBLICATIONS

Definition of "cell" in Radatz, J. "The IEEE Standard Dictionary of Electrical and Electronics Terms", 1996, IEEE, ISBN: 1-55937-833-6, p. 141.

Rahman, S. et al. "A Modular Based Parallel Image Processing System", Proceedings of the Midwest Symposium on Circuits and Systems. Calgary, Aug. 12-15, 1990; vol. 2, Aug. 12, 1990, pp. 930-933, XP000295250.

\* cited by examiner

METHOD AND DEVICE FOR PROCESSING DIGITAL IMAGES

CROSS-REFERENCE TO RELATED APPLICATIONS

This application claims priority under 35 U.S.C. §119 to European Patent Application No. 08159587.8, filed Jul. 3, 2008, which is hereby incorporated herein by reference in its entirety. This application also claims the benefit of U.S. Provisional Application No. 61/078,360, filed Jul. 4, 2008, which is hereby incorporated herein by reference in its entirety.

TECHNICAL FIELD

Disclosed herein are a method, product means, and a device for processing digital representations such as images.

BACKGROUND

Many processing devices process digital representations such as images in the form of pictures, movie frames, etc. The digital representations are usually in the form of cells arranged in a regular grid. For example, images are conventionally represented as equally sized cells, referred to as picture elements or pixels, arranged in a 2-dimensional square grid. Each cell has a cell value associated with it, e.g. representing the colour, intensity or greyscale value of the cell. The position of each cell is conveniently identified in terms of its coordinates in a suitable coordinate system. For example, the pixels of a 2-dimensional image may be identified by their respective coordinates relative to a 2-dimensional Cartesian coordinate system.

There is an increasing demand on the image processing capabilities in processing devices such as portable or handheld devices, e.g. mobile terminals etc. For example, camera images may be encoded using video encoding techniques, and there is an increasing demand for pre-processing functionality of camera images for video encoding combined with increased quality and throughput requirements on displayed images. These and other demands put increasingly higher demands on hardware (HW) for imaging processing.

In particular, it is generally desirable to reduce the data latency impact between the image processing hardware and external memory on which image data may be stored. The external memory bandwidth utilization is typically a bottleneck in a multimedia system's performance. Single accesses to external memory make a HW accelerator considerably sensitive to data latencies.

It is further generally desirable to perform memory access efficiently to extract the necessary pixel information. During imaging processing the same data is commonly read more than once from a word in memory. Depending on the color formats, many pixels are stored in a single word in memory or the information of single pixel is spread out in more than one word in memory.

It is further generally desirable to provide image processing hardware that is tunable/adjustable to fit the available external bandwidth to/from external memory, so as to provide efficient processing for a range of bandwidths.

The design of HW accelerators that fulfil some or all the above requirements has proven to be a complex task, and the properties of the resulting designs are often hard to verify. Moreover, it is desirable to provide a hardware architecture with a performance/functionality that is adaptable to changing requirements by smoothly adding Register Transfer Level (RTL) changes, i.e. without major RTL changes and area increase.

U.S. 2002/0004860 discloses a method of increasing image processing performance by copying image data between a memory and an I/O RAM. In particular, the copying is accomplished by calling a memory copy function (ANSI memcpy). The image data may be copied in a single call of the memory copy function or a subset of the image data may be copied one line at a time by repeated calls of the memory copy function. Even though this prior art method provides a reduced data latency between an image processing hardware and external memory, it remains a problem to provide a flexible architecture that efficiently utilises the available bandwidth.

SUMMARY

Disclosed herein is a processing device for processing a digital representation, the digital representation comprising a plurality of cells, the cells having respective cell values and being arranged in a regular grid, the processing device comprising:
- a first reordering module adapted to perform at least one cell data reordering operation for reordering cell data in memory;
- an arithmetic module adapted to perform at least one arithmetic operation for computing at least a first cell value of a first cell from one or more cell values of respective cells of the digital representation, each arithmetic operation including at least one multiplication;
- an internal shared memory accessible by at least the first reordering module and the arithmetic module;

wherein the processing device is configured to control the first reordering module and the arithmetic module to perform the at least one cell data reordering operation and the at least one arithmetic operation as at least two concurrent processes, each of the concurrent processes reading respective parts of the digital representation from respective memory buffers of the internal shared memory.

Consequently, the processing of the digital representation is partitioned into different processing stages implemented as respective modules/blocks of the processing device that treat the data, e.g. image data, concurrently on a shared memory, e.g. on-chip memory. This partition allows the HW to efficiently take advantage of the maximum available bandwidth from external and internal (on-chip) memory.

The separation of cell data reordering operations from heavy arithmetic operations provides higher performance, and it allows for a more flexible and simpler hardware design which demands less power consumption and allowing for an efficient RTL implementation and verification process.

Furthermore, the partitioning provides a modular architecture that may be fully SW-configurable, and able to be easily upgraded to support future functionality.

The digital representation may be an image and the cells may be pixels arranged in a two-dimensional grid. Nevertheless, embodiments of the processing device described herein may also be used for the processing of other digital representations, in particular spatial representations, e.g. a representation of voxels in a three-dimensional grid. Furthermore, the digital representation may be indicative of any spatially varying property of an object. Generally, a position of each cell in the regular grid may be identifiable by at least one corresponding coordinate associated with the cell.

In the context of the present document, cell data reordering operations are defined as operations performed by a processing device which include at least one memory read access and at least one write access so as to re-group the cell information of a digital representation in memory. Cell data reordering operations may demand adding redundancy, but they do not include mathematical transformations of the cell information. In the context of image data, the cell data reordering operations will also be referred to as pixel data reordering operations.

Cell data reordering operations generally comprise operations such as data packing, address calculation and memory read/write operations. Cell data reordering operations typically do not require calculation of cell values, and in particular not heavy arithmetic operations such as multiply-accumulate operations, filtering operations, or other digital signal processing operations. The cell data reordering operation may include reordering cells within in the regular grid, e.g. by performing a flip operation, a mirror operation, a rotate operate, combining scattered information requiring multiple accesses to one location, unifying cell/pixel data formats by inserting redundant bits and/or the like.

The arithmetic operation process, on the other hand, comprises a mathematical transformation of the actual information content of the cells, and it includes arithmetic operations including multiplications, such as multiply-accumulate operations, filtering operations, or other digital signal processing operations, e.g. operations where more than two terms are to be subjected to a multiply-accumulate operation.

In the context of image processing, examples of such arithmetic operations include the scaling of an image, color conversions from one color space to another, and alpha-blend functions for blending/mixing multiple images. Hence, the above operations include the calculation of cell values based on one or more cell values of the input digital representation.

One frequent operation on such digital representations is the scaling from an original representation to a scaled representation having a different resolution, i.e. a different number of cells per unit length, in one or more dimensions. For example, scaling operations may be required or desirable when images are received and/or stored and/or generated in a resolution different from the resolution required or desirable e.g. for storage, processing by another application, transmission via a communications interface, display on a display, etc.

In some embodiments, the processing device described herein receives multiple digital representations, and the arithmetic operations comprise combining the received multiple digital representations, e.g. by means of alpha-blending or another mixing process or another process for combining digital representations, e.g. transparency methods, methods using masks, and/or the like. For example, alpha blending or alpha composition generally refers to the process in computer graphics of combining two or more images, e.g. an image with a background, to create the appearance of partial transparency. It is often useful to process image elements in separate passes, and then combine the resulting multiple 2D images into a single, final image in a process generally referred to as compositing. In order to correctly combine these image elements, an associated transparency or coverage information for each element is kept. This information may e.g. be stored as a so-called alpha-channel.

Embodiments of the processing device described herein are connectable to an external memory and adapted to read source data, e.g. images, from such an external memory that is external to the processing device, e.g. external to the chip or hardware unit that processes the data. The processing device processes the source data and outputs the processed data, e.g. by writing the processed data back to the external memory or by forwarding the processed data to another device, e.g. a display. The external memory may be an External Random Access Memory (ERAM). The memory location in the external memory from which a digital representation is read will also be referred to as a source buffer (SB).

In some embodiments, the processing device further comprises
 a memory control module adapted to control copying consecutive input parts of the digital representation as respective blocks of data from an external memory to an input buffer of the internal shared memory;
 wherein the processing device is adapted to control one of the first reordering module and the arithmetic module to read the input parts from the input buffer and to write intermediate parts of the digital representation to a first intermediate buffer of the internal shared memory;
 wherein the processing device is adapted to control another one of the first reordering module and the arithmetic module to read intermediate parts of the digital representation from a second intermediate buffer of the internal shared memory and to write processed parts of the digital representation to an output buffer of the internal shared memory; and
 wherein the memory control module is further adapted to control copying consecutive processed parts of the digital representation as respective blocks of data from the output buffer to an external memory.

As most hardware architectures include an efficient mechanism for copying a block of data from one memory location to another, copying blocks of data with respective parts of the digital representation from the external memory to the on-chip shared memory reduces the data flow bottleneck from/to external memory is significantly. The access to the digital representations in the on-chip shared memory by the concurrent processes may thus be performed in parallel/concurrently with the block copying.

The block copying may e.g. be based on burst transfers between internal and external memory, e.g. as in the memcopy function. In embodiments where the regular grid comprises an array of scan lines, each scan line comprising a sequence of cells, copying a block of data between an external memory and the shared on-chip memory may comprise copying at least a part of a scan line. The term scan line may refer to a line in a 2D array of pixels. Accordingly, the respective memory buffers from which the concurrent processes read parts of the digital representation may comprise scan lines or parts thereof. The first and second intermediate buffers may be the same buffer or different buffers.

In some embodiments one or more of the respective buffers in internal memory may be First-In-First-Out (FIFO) buffers, e.g. implemented as circular buffers.

In one embodiment, the processing device further comprises a second reordering module; and the processing device is configured to control the first and second reordering modules and the arithmetic module to perform the at least one reordering operation and the at least one arithmetic operation as at least three concurrent processes including a first cell data reordering process performed by the first reordering module, an arithmetic process performed by the arithmetic module, and a second cell data reordering process performed by the second reordering module. Each of the three processes reads/writes data from/to respective buffers in internal memory. For the purpose of the present description, the three processes will also be referred to as pre-compose, compose, and post-compose processes/stages, respectively, as image composition of an output image from multiple input images may be one of the processes performed by the compose stage. This separation into three concurrent processes provides a high degree of flexibility and efficiency while limiting the required memory and overhead requirements.

In one embodiment, the first reordering process reads consecutive parts of an input digital representation from at least one input buffer and writes reordered data into at least a first buffer; wherein the arithmetic process reads reordered data from the at least one first buffer and writes processed data into at least one second buffer; and wherein the second reordering process reads processed data from the at least one second buffer and writes data into an output buffer.

The present invention relates to different aspects including the processing device described above and in the following, corresponding methods, apparatuses, and computer programs, each yielding one or more of the benefits and advantages described in connection with the above-mentioned processing device, and each having one or more embodiments corresponding to the embodiments described in connection with the above-mentioned processing device.

The processing device may be implemented partly or completely in hardware, e.g. a processing unit including a HW imaging processing acceleration block for handling MIPS-consuming image processing operations on camera and display images as well as video frames and images that contain information to be used in a graphical user interface (Man Machine Interface—MMI).

The term processing device is intended to comprise any electronic device comprising processing means for data processing. In particular, the term processing device is intended to comprise any electronic equipment, portable radio communications equipment, and other handheld or portable devices, and integrated circuits, microprocessors, chips or chipsets for use in such equipment. In some embodiments, a processing device comprises at least one of storage means for storing the scaled digital representation and a display for displaying the scaled digital representation. The term portable radio communications equipment includes all equipment such as mobile terminals, e.g. mobile telephones, pagers, communicators, electronic organisers, smart phones, personal digital assistants (PDAs), handheld computers, or the like.

The term storage medium is intended to include any circuitry or device suitable for storing digital data items. Examples of such storage media include non-volatile memory, a read-only-memory (ROM), a random access memory (RAM), a flash memory, an Erasable Programmable Read-Only Memory (EPROM), or the like. In some embodiments, the storage medium is included in the processing device.

It is noted that the features of the methods described herein may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Hence, according to another aspect, a computer program comprises program code means adapted to cause a data processing device to perform the steps of the method described herein, when said computer program is run on the data processing device. For example, the program code means may be loaded in a memory, such as a RAM (Random Access Memory), from a storage medium or from another computer via a computer network. Alternatively, the described features may be implemented by hardwired circuitry instead of software or in combination with software.

BRIEF DESCRIPTION OF THE DRAWINGS

The above and other aspects will be apparent and elucidated from the embodiments described with reference to scaling of two-dimensional images represented by pixels arranged in scan lines and columns and with reference to the drawing in which.

DETAILED DESCRIPTION

Figure 1:
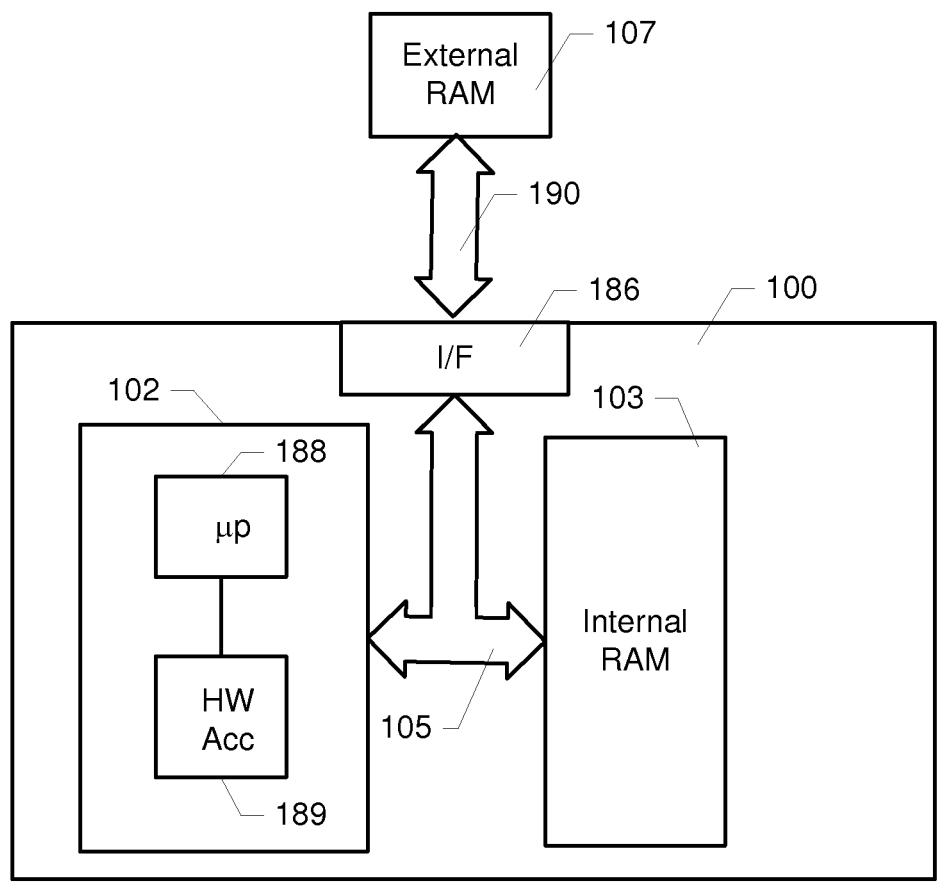
FIG. 1 shows a schematic block diagram of an embodiment of a processing device.

FIG. 1 shows a schematic block diagram of a processing device, e.g. in the form of an Application Specific Integrated Circuit (ASIC) for example an ASIC for use in a mobile terminal or any other electronic equipment. The processing device, generally designated 100, comprises a central processing logic block 102, an interface block 186 for inputting/outputting data to/from the processing device, and an internal RAM 103 or other form of internal memory. It is understood, however, that the processing device may include additional blocks such as additional memory blocks or storage devices, controllers, etc.

Figure 2:
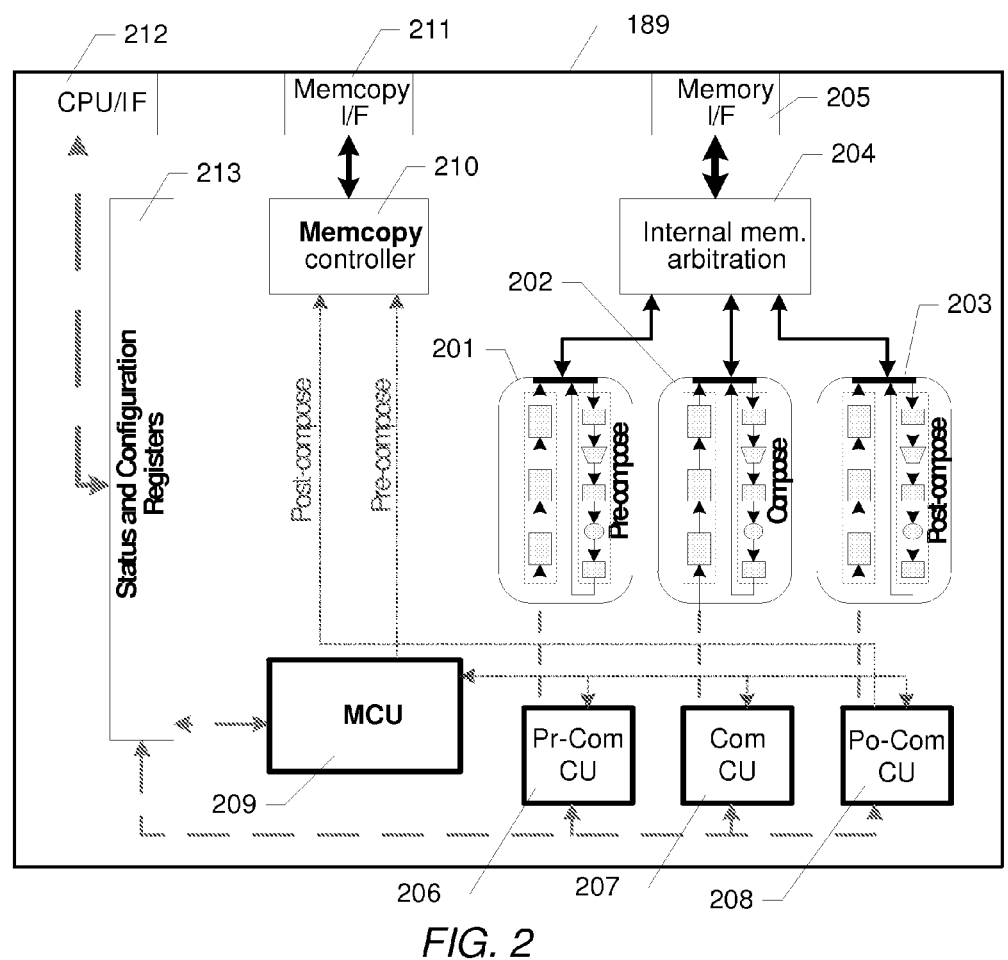
FIG. 2 shows a schematic block diagram of an embodiment of a hardware accelerator for image processing.

The central processing logic block 102 comprises a programmable processor 188, e.g. a CPU or other logic circuitry suitable for controlling the operation of a mobile terminal or other electronic equipment, e.g. by executing program code. The central processing logic block 102 further comprises a hardware accelerator block 189 configured to perform the method described herein, e.g. an hardware accelerator block as shown in FIG. 2. Alternatively, the process described herein may be implemented partly or completely in software, e.g. software executed by the processor 188.

The processing device 100 is connected via the interface block 186 to an external RAM 107 or other type of external memory. For example, the interface block 186 may include an external memory controller or other circuitry for allowing the processing device 100 to access the external RAM 107. The processing device 100 may be connected to the external RAM 107 via an external bus 190. In contrast to the internal RAM 103, the external RAM 107 is not located on the same chip as the central processing block, and it may be shared with other processing devices. Consequently, access to the external RAM 107 may be considerably slower compared to the internal RAM 103 which is only accessed by the processing device 100. The processor 188 is connected to the accelerator block 189 directly, as shown, or via an internal bus 105.

Even though the internal RAM 103 is shown separate from the central processing logic 102, it will be appreciated that the processing device 100 may include additional or alternative types of internal RAM, e.g. an internal RAM included in the processor 188 or otherwise included in the central processing logic 102.

FIG. 2 shows a schematic block diagram of an embodiment of a hardware accelerator for image processing.

The hardware accelerator 189 comprises three sub-blocks that perform different stages of the image processing, e.g. an update frame composition. In particular, the three sub-blocks include a pre-compose block 201, a compose block 202, and a post-compose block 203. Each of these sub-blocks concurrently performs image processing operations on scanline-based FIFO buffers stored in the internal RAM 103 of the processing device 100. The concurrent processing of different stages of the image processing provides a further boost to the enhanced performance given by the memcopy transfers done also in parallel. Each of the processing blocks 201, 202, 203 accesses the internal memory 103 via an internal memory arbitration block 204 and a memory interface 205.

The hardware accelerator further comprises control units 206, 207, 208 for controlling the operation of the pre-compose block 201, the compose block 202, and the post-compose block 203, respectively. The hardware accelerator further comprises a control unit 209 for controlling and synchronising the overall operation of the three processing blocks and the copying of data to/from external memory, and for assigning read/write access to the respective buffers from/to which the blocks 201-203 can read/write, etc. The hardware accelerator further comprises a memcopy controller 210 for controlling via memory interface 211 the copying of blocks of data from an external memory, e.g. memory 107, to the internal memory 103 and vice versa.

For example, the control unit 206 controls the processing of the pre-compose block 201, e.g. including signalling to the control unit 209 when to request a memcopy of the next image data block from the external memory to the internal memory from which the pre-compose block 201 can access it. The control unit 206 may further signal to the control unit 209 when the pre-compose block 201 has finished writing pre-composed image data to an output buffer so that it can be accessed by the subsequent compose block 202. Alternatively, the control unit 206 may signal a buffer location up to which the pre-compose block 201 has finished processing the buffer contents. In some embodiments, the image processing involves multiple source buffers (as is e.g. the case in the example use case described below), and the pre-compose block 201 may thus process multiple source buffers concurrently, e.g. in a time-multiplexed manner. Accordingly, in this case, the control unit 206 may control the multiplexing. Similarly, the control unit 207 may receive information from the control unit 209 as to when the compose block 202 can start processing data in a given buffer, and the control unit 207 may control the compose block 202 accordingly. Upon completion of a given buffer (or part thereof), the control unit 207 may signal to the control unit 209 accordingly. Finally, the control unit 208 may receive information from the control unit 209 as to when the post-compose block 203 can start processing data in a given buffer, and the control unit 208 may control the post-compose block 203 accordingly. Upon completion of a given (part of a given) buffer, the control unit 208 may then signal to the memcopy controller 210 to copy the contents of the completed buffer to the external memory.

The hardware accelerator further comprises a number of registers 213 that can be set and/or read by the processor 188 via interface 212. The registers 213 may comprise configuration parameters that can be set by the processor 188 and status registers that that are readable by the processor 188. For example, the configuration registers may include configuration parameters such as buffer size(s), format information about the image format to be processed, etc.

The three functional stages 201, 202, and 203 provide an architecture where pixel data reordering operations are separated from heavy arithmetic operations. This separation provides not only higher performance, but also more flexible and simpler hardware, which demands less power consumption. Moreover, the RTL implementation and verification becomes more efficient.

Functions like crop, rotation, flip and mirror demand data arrangement in memory, so they are advantageously handled in the pre-compose stage, i.e. by the pre-compose block 201. Other pre-compose functions include combining scattered information requiring multiple accesses to one location, such as the YUV images stored in separate buffers, and unifying pixel data formats from 8 bpp (bits per pixel) to 16 bpp by inserting redundant bits. Operations like scale, color conversion, alpha blend operations comprise several multiplications, and they are advantageously handled in the compose stage 202. The post-compose stage 203 treats the composed pixels and re-arranges their color format data before they are written to external memory.

Embodiments of the hardware accelerator 189 can receive image representations of different color formats. Supporting different color formats of the image stored in external memory adds complexity to the memory address generation of the pre-compose and post-compose stages. For example, in order to obtain the information of a certain pixel of an image stored in YUV 4:2:0 separated format, three read accesses to the external memory may be necessary, while accessing the value of one pixel of an image stored in RGB888 may only demand one access, or two in case the pixel is broken in two words. Embodiments of the hardware accelerator solve this problem by using a standardized internal color format, e.g. an ARGB-like (32 bpp) internal color format which specifies a color with alpha, red, green, and blue values. Thus, the pre-compose stage 201 arranges one read access for each color channel (including any alpha channel) and combines the values to one value in the internal color format at one location.

The pre-compose stage 201 arranges the input image date (i.e. the data read from the external memory) in internal memory, thus providing a general and systematic way of accessing any pixel of the source buffers in internal memory. For example, pixel information that in the input representation is split in different buffers is put together, thus obtaining an efficient pixel organization in internal memory that consists in one pixel per 32-bit-word, regardless of what the original color format is. As a consequence, the implementation of the address calculations in the subsequent compose stage 202 becomes much simpler. Once the data from the source buffer has been pre-fetched from external memory by the memcopy function, the pre-compose stage 201 may further rearrange the image data according to one or more pixel reordering operations such as rotate/flip/mirror etc.

The compose stage 202 consists of an arithmetic pixel-based pipeline that executes scaling, color conversion as well as the alpha-blend functions on a per-pixel level. In one embodiment, the scaling, color conversion as well as the alpha-blend functions are executed in that specific order so as to reduce processing, since color conversion of the whole image before scaling is uneconomical, and since alpha-blending should be done when the pixels have been converted to the same color format. The scale function is the first one to be executed in the pipeline. The scale operation typically calculates each pixel value in a scaled image from a number of pixels in the original (input) image. In each step, one pixel value in the original color format (e.g. RGB or YUV) is produced, which in turn is the input for the color conversion function which results in a color converted pixel. The result of the color conversions together with corresponding pixel from another buffer (e.g. a masking pixel in the use case described below) are the inputs of the alpha-blending function. The resulting pixel is written back to internal memory. It will be understood that the compose stage 202 may perform alternative or additional functions such as gamma correction and/or the like.

In the post-compose stage 203, the processed pixels are reorganized in internal memory according to the data format in external memory, before being written to the desired location in external memory by the memcopy function. Hence, the post-compose stage may be regarded as implementing the inverse process of at least a sub-process of the pre-compose stage.

Hence, the pre-compose, compose, and post-compose stages may be regarded as a pipeline that operates on image parts, e.g. one or more scan-lines, depending on the buffer size, while at least the compose stage of this buffer-based pipeline may be implemented as a pixel-based pipeline, where the contents of a buffer are processed pixel by pixel.

An example of an image composition process performed by the hardware accelerator described herein will now be described with reference to FIGS. 3 and 4.

Figure 3:
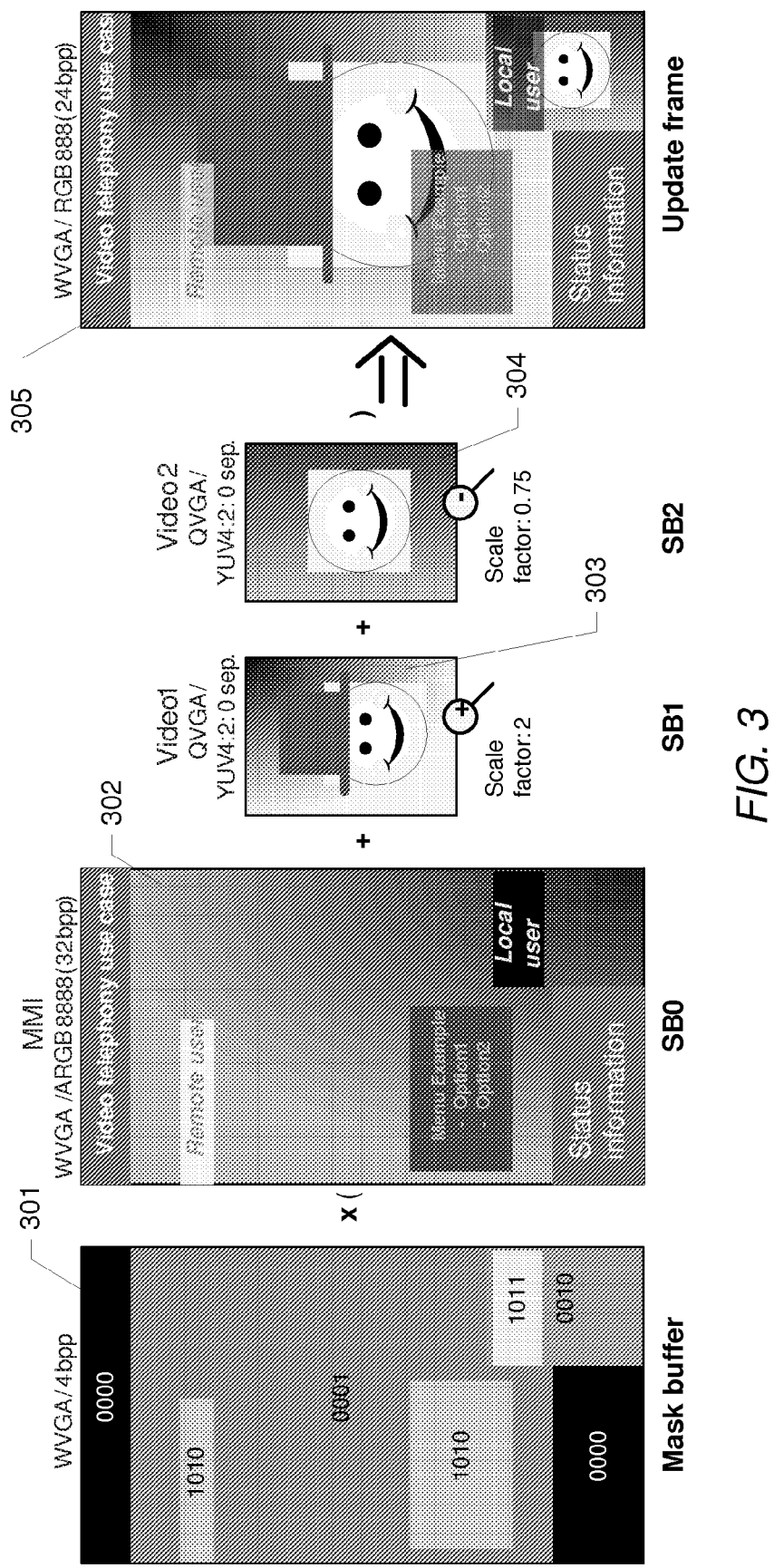
FIGS. 3 and 4 illustrate an example of the operation of an embodiment of a 2D graphics accelerator block and of the allocation of source buffers in internal memory.

FIG. 3 illustrates an example of the operation of an embodiment of a 2D graphics accelerator block, e.g. hardware accelerator block 189, operating as an image composition engine. In the example of FIG. 3, the image composition engine reads four source images 301, 302, 303, and 304—each of them stored in a respective source buffer (SB) in external memory, e.g. external RAM—and assembles an image 305 that can be sent to a display, a television, etc. or written back to external memory. For the purpose of the present description, the image 305 resulting from the image composition will also be called an update frame (UF), as each source buffer and the update frame may contain an image intended to be used for video, camera, MMI, video telephony, or gaming data. However, it will be appreciated that the hardware accelerator may also be used for other image processing applications, including the processing of individual images, video frames, etc. Likewise, it will be appreciated that the hardware accelerator described herein may be used for processing a different number of input source buffers without and/or without combining input source buffers.

In the example of FIG. 3, the source buffers 303 and 304 contain images of the remote user and the local user, respectively, of a video telephony system, while source buffer 302 contains a background image, user menu, status and other information for display during the video telephony session. Finally source buffer 301 comprises a pixel mask indicating blending information for use in the alpha blending process. The combining process to be performed by the image composition engine may include an appropriate scaling of some of the source buffers—in the example of FIG. 3 source buffer 303 is to be scaled by a scaling factor of 2, while source buffer 304 is to be scaled by a scaling factor of 0.75—and a subsequent alpha-blending of the buffers 302-304 as determined by the pixel mask represented by source buffer 301. However, it will be appreciated that the hardware accelerator described herein may process any type of image information and may include alternative and/or additional processing steps.

Furthermore, in the example of FIG. 3, the source buffers 301-304 are represented in different color formats. In this example, mask buffer 301 is represented in a WVGA/4 bpp format, source buffer 302 is represented in a WVGA/ARGB8888 (32 bpp) format, while source buffers 303 and 304 are represented in a QVGA YUV 4:2:0 sep format. In this example the update frame 305 is to be stored in WVGA/RGB888 (24 bpp) format. For example the Wide VGA (WVGA) format may include 854×480 pixels, the Quarter VGA (QVGA) format may include 320×240 pixels. Hence, the example of FIG. 3 further illustrates that the hardware accelerator described herein may support source buffer data represented in different color formats and/or output data represented in different color formats. It will be appreciated, however, that the source and/or mask buffers may be represented in other color formats. For example, the mask buffer could alternatively be represented at 8 bpp or higher.

For example the hardware accelerator may receive information about the number of source buffers, their respective data formats, scaling factors, and/or other relevant parameters in suitable registers, e.g. registers 213 of FIG. 2.

Figure 4:
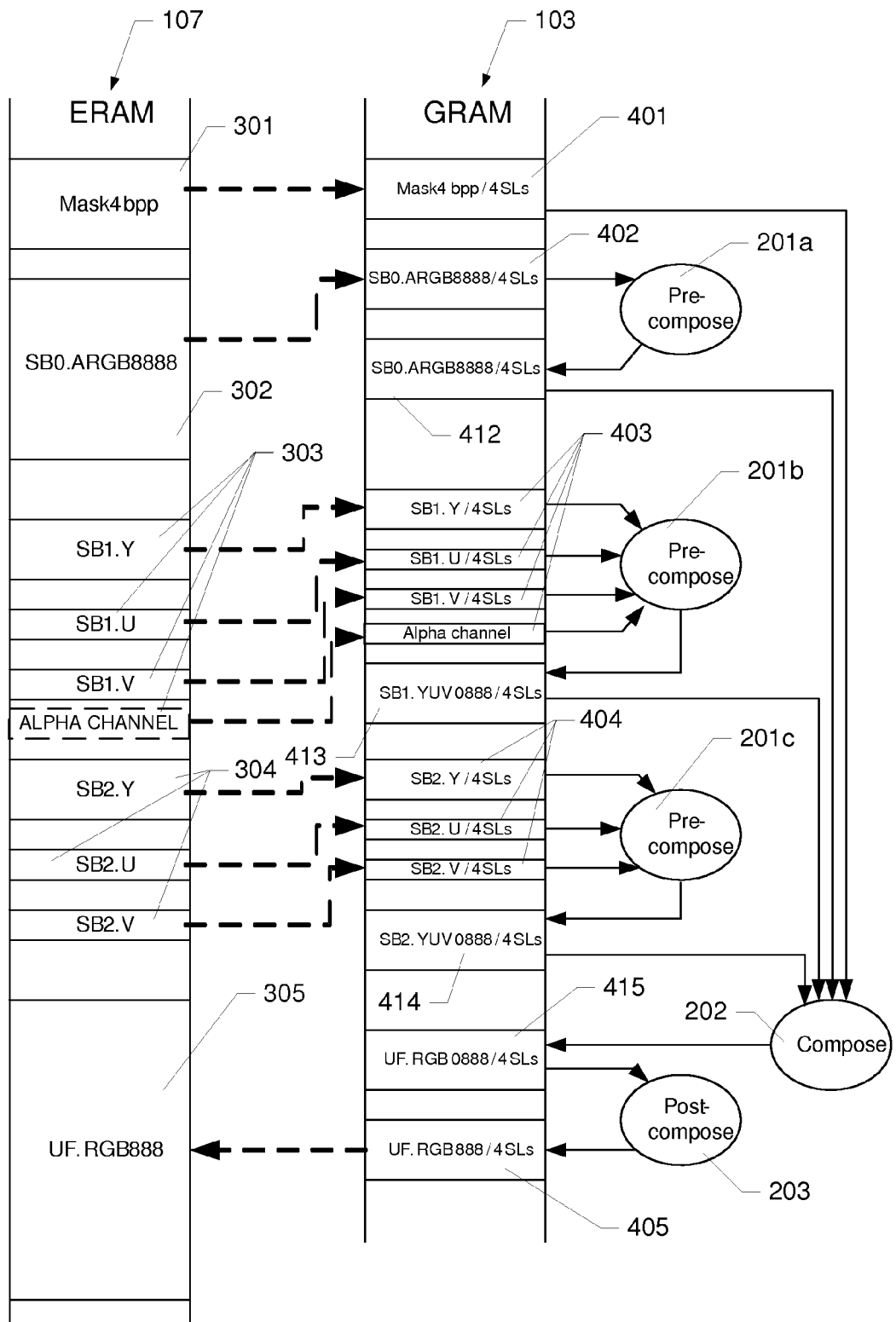

FIG. 4 illustrates an example of the use of the image composition engine for accelerating the frame composition in the use case illustrated in FIG. 3, i.e. a video telephony use case. It will be appreciated, however, that the hardware accelerator described herein may also be used for other image processing tasks performed on a single or multiple source buffers.

In particular, FIG. 4 shows an allocation of buffers in external data memory 107, e.g. external RAM (ERAM), and an internal memory 103, e.g. an internal graphics RAM (GRAM). In the example of FIG. 4, the external memory 107 has stored thereon source buffers 301, 302, 303, and 304, each including image data in respective color formats.

As mentioned above, embodiments of the hardware accelerator support both YUV (YCbCr) and RGB color formats for all the source buffers. YUV images are stored in memory as interleaved data or as separated buffers, as illustrated for buffers 303 and 304. RGB images may be stored in memory 107 as RGB565 (16 bpp), RGB888 (24 bpp) or RGB0888 (32 bpp). In addition, there may be a per-pixel alpha channel that can be associated to each source buffer. This alpha channel can be stored in a separated buffer in ERAM for each source buffer, e.g. as illustrated for buffer 303 in FIG. 4, or the alpha channel may be embedded in a suitable color format the individual source buffers, e.g. embedded as ARGB8888. The alpha channel shown for SB1 is also copied to GRAM and processed by the pre-compose stage 201*b* together with the contents of the remaining buffers 403 corresponding to source buffers 303 and resulting in the intermediate buffer 413. In a 2D image source buffer which stores a color for each pixel, an additional value may be stored in the alpha channel containing a value ranging from 0 to 1 (e.g. 00h to FFh with 8 bpp). A value of 0 may mean that the pixel does not have any coverage information and is fully transparent, while a value of 1 may mean that the pixel is fully opaque.

During the image processing process by the hardware accelerator described herein, each source buffer can independently be cropped, rotated and mirrored as well as scaled. Furthermore, YUV images can be converted to RGB data, and vice versa. All those functions as well as the image properties (size and color formats) are designed to be individually configurable by SW for each source image, with a set of configuration registers accessed through a CPU I/F, as described in connection with register 213 of FIG. 2. A per-pixel embedded alpha channel allows the source buffers 302-304 to be alpha-blended with one of the other source buffers at a time, thus creating a transparency effect on the resulting image.

A mask buffer 301 may be used in order to select the update frame's pixels out of any of the processed source buffers or from the results of the alpha-blending. The mask is an image that may have the same size as the update frame, and it may be used and interpreted in different ways, depending on the actual implementation. Generally, the mask buffer code (0000 etc) may be mapped to a specific source buffer. As an alternative to using a mask buffer, the image may be built with layers e.g. representing foreground and background or more layers placed in order, so that layers placed in the foreground cover lower layers.

The processing device 100 may use a memcopy function, which is based on burst transfers between internal and external memory, to pre-fetch large chunks of data from ERAM to internal RAM, or to post-write data from internal RAM to ERAM. This function may be employed to transfer image parts, e.g. image scanlines (SL), into respective buffers 401-404 in internal memory, e.g. embodied as FIFO buffers in internal RAM. The FIFO buffers may be implemented as circular buffers. In parallel to the memcopy transfers between ERAM and internal RAM, the processing device 100 performs data processing operations using the data stored in the buffers 401-404 and 412-415 in internal memory. As a consequence, the data flow bottleneck from/to external memory is significantly reduced.

An example of the allocation of the source buffers in ERAM as well as the above mentioned scanline-based FIFOs in internal RAM is illustrated in FIG. 4, regarding the video telephony use case. As described above, image scanlines from the respective source buffers are copied by the memcopy function into respective buffers 401-404 in the internal memory. Intermediate results of the processing stages as well as the final image data are stored in other scanline-based FIFOs in internal RAM. In particular, the pre-compose process 201a-c reads the scanlines from the buffers 401-404, performs the respective reordering operations described above, and stores the resulting reordered scanlines in intermediate buffers 412-414, respectively. The compose process 202 reads the reordered data from the intermediate buffers 412-414 and the mask data from buffer 301, performs the composition process, and stores the resulting scanlines of the combined image in a further immediate buffer 415. The post-compose process 203 reads scanlines from the immediate buffer 415, performs the post-compose reordering operations described above, and stores the resulting scanlines of the final image into buffer 405, from where the scanlines are copied back into the frame buffer 305 in ERAM.

The number of scanlines and pointers for each buffer may be individually configured by SW, e.g. via suitable configuration registers as described above. Hence, during the processing of an image, all three process stages 201, 202, and 203 are performed concurrently, where the subsequent stage(s) process(es) scanlines that already have been processed by the previous stage(s), while the initial stage(s) already start(s) processing new scanlines. The coordination or synchronization of the concurrent processes may allow the memcopy function to overwrite parts of the circular buffer 401, as soon as the compose process is done with that part and operates on a different part of the buffer 401, i.e. only used data is overwritten. The access to the buffer 401 may be controlled by pointers where the compose process is told from where to where it is safe to read, and the memcopy is told which part it may overwrite. Alternatively or additionally, the coordination may utilize counters and handshake signals, or FULL/EMPTY signals with regard to the buffers.

In examples where the image composition engine operates on multiple source buffers, as is the case in the example of FIG. 4, the pre-compose stage may operate on all source buffers concurrently, as illustrated by pre-compose sub-processes 201a-c in FIG. 4, so as to ensure that the respective intermediate buffers 412-414 are populated with data allowing the subsequent compose stage 202 to start operating. For example, the pre-compose block 201 of FIG. 2 may be controlled to operate on the input buffers 402-404 in a time-multiplexed manner, processing one or more scanlines or parts thereof for each source buffer, before processing the next set of scanlines (or parts thereof) from each buffer. Alternatively or additionally, the hardware accelerator circuit may include multiple pre-compose and compose blocks that operate concurrently on separate buffers.

Hence the embodiments of an image processing process and device including a partition of the imaging operations into two categories, namely pixel data reordering and heavy arithmetic operations, allow a low-complex implementation and efficient verification of a complex FIFO-based architecture that uses shared memory. The efficiently verifiable design thus results in shorter and less expensive development and update processes. The architecture combines the benefits from two different processing strategies to implement the image processing functions in HW, namely a scanline-based FIFOs and pixel-based pipeline approach. In the scanline-based FIFOs strategy, the processing scanline data is stored in FIFOs between each single operation (i.e. rotate, scale, color conversion, alpha blending, etc.). For example, one scanline is scaled completely in X-direction before the scaling in Y-direction begins. On the other hand, the pixel-based pipeline strategy does not store partly processed pixels in FIFOs between each single operation. Instead, a deep pipelined datapath is employed, which starts to process a new pixel before the previous is completely processed. The compose stage is based on the pipelined-based strategy but with a short depth, since it comprises only three pixel operations.

Since there are many processing functions involved in image composition, using a fully scanline-based FIFOs strategy for every single operation would demand not only a very complex inter-function synchronization mechanism, but also the need to control more FIFOs in the shared on-chip memory. In contrast, a fully pixel-based pipeline strategy would demand implementing a very long and non-flexible datapath. Both extremes result in a very complex implementation.

The embodiments of the image processing process and device described above further allow a configurable performance with different sizes of scanline-based FIFOs throughout the image processing stages. As a result, different applications are allowed to balance the tradeoff between performance and internal memory consumption for different use cases. In addition, the design is much less sensitive to data latencies from/to external memory due to the use of pre-fetch and post-write.

It is possible to easily add more functions with no need to rewrite the RTL code for the entire block when new functionality is demanded. This can be achieved by incorporating extra intermediate pixel processing stages comparable with the compose stage, or by upgrading the compose stage itself. In addition, it is possible to add support for more color formats by upgrading only the pre- and post-compose stages, since an internal ARGB-like format may be employed in the shared memory to simplify the use of any input color format.

Although some embodiments have been described and shown in detail, the invention is not restricted to them, but may also be embodied in other ways within the scope of the subject matter defined in the following claims.

In particular, the embodiments have mainly been described with reference to a mobile terminal as an example of a data processing device. It is understood, however, that the method, product means, and device described herein may also be applied to other data processing devices.

The method, product means, and device described herein can be implemented by means of hardware comprising several distinct elements, and/or partly or completely by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A processing device for processing a digital representation, the digital representation comprising a plurality of cells, the cells having respective cell values and being arranged in a regular grid, the processing device comprising:
 a first reordering module adapted to perform at least one cell data reordering operation for reordering cell data and storing the reordered cell data into an internal shared memory;
 an arithmetic module adapted to perform at least one arithmetic operation for computing at least a first cell value of a first cell from one or more cell values of respective cells of the digital representation retrieved from the internal shared memory, each arithmetic operation including at least one multiplication;
 a second reordering module; and
 the internal shared memory accessible by at least the first reordering module and the arithmetic module,
 wherein the processing device is configured to control the first reordering module and the arithmetic module to perform the at least one cell data reordering operation and the at least one arithmetic operation as at least two concurrent processes, each of the concurrent processes reading respective parts of the digital representation from respective memory buffers of the internal shared memory,
 wherein the processing device is configured to control the first reordering module and the arithmetic module such that at least one of the one or more cell values of respective cells of the digital representation retrieved from the internal shared memory and used by the arithmetic module includes previously produced reordered cell data previously produced by the first reordering module and previously stored into the shared internal memory, and
 wherein the processing device is configured to control the first and second reordering modules and the arithmetic module to perform the at least one reordering operation and the at least one arithmetic operation as at least three concurrent processes including a first cell data reordering process performed by the first reordering module, an arithmetic process performed by the arithmetic module, and a second cell data reordering process performed by the second reordering module.

2. The processing device according to claim 1, wherein the internal shared memory is an on-chip memory arranged on the same chip as the first reordering module and the arithmetic module.

3. The processing device according to claim 2, wherein the first reordering module and the arithmetic module are adapted to access respective parts of the digital representation concurrently in the internal shared on-chip memory.

4. The processing device according to claim 1, further comprising:
 a memory control module adapted to control copying consecutive input parts of the digital representation as respective blocks of data from an external memory to an input buffer of the internal shared memory,
 wherein the processing device is adapted to control one of the first reordering module and the arithmetic module to read the input parts from the input buffer and to write intermediate parts of the digital representation to a first intermediate buffer of the internal shared memory;
 wherein the processing device is adapted to control another one of the first reordering module and the arithmetic module to read intermediate parts of the digital representation from a second intermediate buffer of the internal shared memory and to write processed parts of the digital representation to an output buffer of the internal shared memory; and
 wherein the memory control module is further adapted to control copying consecutive processed parts of the digital representation as respective blocks of data from the output buffer to an external memory.

5. The processing device according to claim 4, wherein each of the input buffer, the first and second intermediate buffers and the output buffers is a FIFO buffer.

6. The processing device according to claim 4, wherein the processing device is adapted to perform the copying of blocks of data between an external memory and the internal shared memory as burst transfers between the external memory and the internal shared memory.

7. The processing device according to claim 1, wherein the first reordering module is adapted to read consecutive parts of an input digital representation from at least one input buffer and to write reordered data into at least a first buffer; wherein the arithmetic module is adapted to read reordered data from the at least one first buffer and to write processed data into at least one second buffer; and wherein the second reordering module is adapted to read processed data from the at least one second buffer and to write data into an output buffer.

8. The processing device according to claim 1, wherein the at least one cell data reordering operation comprises reordering one or more cells within the regular grid.

9. The processing device according to claim 8, wherein the at least one cell data reordering operation comprises at least one operation chosen from a flip operation, a rotate operation, a crop operation, and a mirror operation of cells of the grid, an operation for combining scattered information requiring multiple accesses to one location of the grid, and an operation for unifying cell data formats by inserting redundant bits.

10. The processing device according to claim 1, wherein the at least one arithmetic operation comprises at least one of a scale operation, a cell value conversion, and a blend operation.

11. The processing device according to claim 1, wherein the at least one cell data reordering operation comprises arranging the digital representation in a predetermined data format wherein each cell is stored in a respective memory word.

12. The processing device according to claim 1, wherein the processing device comprises a hardware accelerator comprising the first reordering module and the arithmetic module.

13. The processing device according to claim 12, wherein the hardware accelerator further comprises a second reordering module.

14. The processing device according to claim 12, wherein the hardware accelerator further comprises a memory control unit configured to cause the processing device to copy one or more blocks of data between an external memory and respective buffers of shared memory.

15. The processing device according to claim 1, wherein the processing device is a programmable microprocessor.

16. A method implemented by a processing device of processing a digital representation, the digital representation comprising a plurality of cells, the cells having respective cell values and being arranged in a regular grid, the method comprising:
performing at least one cell data reordering operation on cell data to produce reordered cell data and storing the reordered cell data into an internal shared memory;
retrieving one or more cell values of respective cells of the digital representation from the internal shared memory and performing at least one arithmetic operation for computing at least a first cell value of a first cell from the one or more cell values of respective cells of the digital representation retrieved from the internal shared memory, each arithmetic operation including at least one multiplication;
performing the at least one cell data reordering operation and the at least one arithmetic operation as at least three concurrent processes including a first cell data reordering process, an arithmetic process and a second cell data reordering process,
wherein the method comprises performing the at least one cell data reordering operation and the at least one arithmetic operation as at least two concurrent processes, each of the concurrent processes reading respective parts of the digital representation from respective memory buffers of the internal shared memory, and
wherein at least one of the one or more cell values of respective cells of the digital representation retrieved from the internal shared memory and used by the at least one arithmetic operation includes previously produced reordered cell data previously produced by the first reordering module and previously stored into the shared internal memory.

17. The method according to claim 16, wherein the concurrent processes access respective parts of the digital representation concurrently in a shared on-chip memory.

18. The method according to claim 16, further comprising:
copying consecutive input parts of the digital representation as respective blocks of data from an external memory to an input buffer of the shared memory;
reading by one of the concurrent processes the input parts from the input buffer and writing intermediate parts of the digital representation to a first intermediate buffer of the shared memory;
reading by another one of the concurrent processes intermediate parts of the digital representation from a second intermediate buffer of the shared memory and writing processed parts of the digital representation to an output buffer of the shared memory; and
copying consecutive processed parts of the digital representation as respective blocks of data from the output buffer to an external memory.

19. The method according to claim 18, wherein copying blocks of data between an external memory and the shared memory comprises performing burst transfers between the external memory and the shared memory.

20. The method according to claim 18, wherein the regular grid comprises an array of scan lines, each scan line comprising a sequence of cells; and wherein copying a block of data between an external memory and the shared memory comprises copying at least a part of a scan line.

21. The method according to claim 16, wherein the first cell data reordering process reads consecutive parts of an input digital representation from at least one input buffer and writes reordered data into at least a first buffer; wherein the arithmetic process reads reordered data from the at least one first buffer and writes processed data into at least one second buffer; and wherein the second cell data reordering process reads processed data from the at least one second buffer and writes data into an output buffer.

22. A non-transitory computer readable storage medium having stored therein a computer program product comprising program code means adapted to perform a method when said program code means are executed on a data processing device, the method being for processing a digital representation, the digital representation comprising a plurality of cells, the cells having respective cell values and being arranged in a regular grid, and the method comprising:
performing at least one cell data reordering operation on cell data to produce reordered cell data and storing the reordered cell data into an internal shared memory;
retrieving one or more cell values of respective cells of the digital representation from the internal shared memory and performing at least one arithmetic operation for computing at least a first cell value of a first cell from the one or more cell values of respective cells of the digital representation retrieved from the internal shared memory, each arithmetic operation including at least one multiplication;
performing the at least one cell data reordering operation and the at least one arithmetic operation as at least three concurrent processes including a first cell data reordering process, an arithmetic process and a second cell data reordering process,
wherein the method comprises performing the at least one cell data reordering operation and the at least one arithmetic operation as at least two concurrent processes, each of the concurrent processes reading respective parts of the digital representation from respective memory buffers of the internal shared memory, and
wherein at least one of the one or more cell values of respective cells of the digital representation retrieved from the internal shared memory and used by the at least one arithmetic operation includes previously produced reordered cell data previously produced by the first reordering module and previously stored into the shared internal memory.

23. An apparatus comprising a processing device according to claim 1.

24. The apparatus according to claim 23, further comprising an external memory external to the processing device, and wherein the processing device comprises a memory control unit to cause the processing device to copy one or more blocks of data between the external memory and one or more respective buffers of the internal memory.

25. The apparatus according to claim 23, wherein the apparatus is a mobile terminal.

* * * * *